(12) United States Patent
Jessberger

(10) Patent No.: US 6,406,033 B1
(45) Date of Patent: Jun. 18, 2002

(54) SEALING ELEMENT

(75) Inventor: Thomas Jessberger, Rutesheim (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/529,487

(22) PCT Filed: Oct. 14, 1998

(86) PCT No.: PCT/EP98/06503

§ 371 (c)(1),
(2), (4) Date: Jun. 27, 2000

(87) PCT Pub. No.: WO99/19647

PCT Pub. Date: Apr. 22, 1999

(30) Foreign Application Priority Data

Oct. 14, 1997 (DE) .......................... 197 45 348

(51) Int. Cl.[7] .......................... H02G 15/04; F16J 15/02; F02M 35/10; F16L 19/00
(52) U.S. Cl. .................. 277/616; 277/637; 277/640; 123/184.21; 285/379
(58) Field of Search .................. 277/603, 608, 277/609, 616, 630, 637, 640, 650, 922, 925; 123/184.21; 285/184, 379, 380

(56) References Cited

U.S. PATENT DOCUMENTS

| 3,182,119 | A | * | 5/1965 | Millard |
| 3,963,268 | A | * | 6/1976 | Widdicombe |
| 4,819,954 | A | * | 4/1989 | Fucci et al. |
| 4,957,680 | A | * | 9/1990 | Saxod et al. |
| 5,121,932 | A | * | 6/1992 | Goldman et al. |
| 5,172,999 | A | * | 12/1992 | Ijima et al. |
| 5,468,023 | A | * | 11/1995 | Galle et al. |
| 5,655,795 | A | * | 8/1997 | Strnad et al. |
| 5,852,854 | A | * | 12/1998 | Pierrot et al. |
| 6,173,969 | B1 | * | 1/2001 | Stoll et al. |
| 6,267,386 | B1 | * | 7/2001 | Loll et al. |

* cited by examiner

Primary Examiner—Anthony Knight
Assistant Examiner—Vishal Patel
(74) Attorney, Agent, or Firm—Crowell & Moring LLP

(57) ABSTRACT

A sealing element particularly for sealing two parallel planar surfaces, which sealing element includes a supporting element with two or more catch or snap-fastening elements for connecting the support element to one of the planar surfaces by engaging mating areas; the sealing element also includes an elastomer element on each side of the support element facing the parallel surfaces such that each elastomer element creates a seal between the support element and a respective one of the parallel surfaces.

2 Claims, 3 Drawing Sheets

SEALING ELEMENT

BACKGROUND OF THE INVENTION

The invention relates to a sealing element.

For sealing between two components it is known to provide sealing rings or the like. If the sealing rings should be fastened against loss to any of the components, an interlocking gasket is usually used, which is tucked or snapped manually or by machine into a matching opening in a component. This attachment of a gasket is very time-consuming. Especially when a large number of such sealing systems are necessary on a component, such a method of assembly becomes uneconomical.

SUMMARY OF THE INVENTION

It is therefore the object of the invention to provide a sealing element which is of simple design, achieves a reliable seal between two components, and requires only a brief time for installation. This object is achieved by the invention as described and claimed hereinafter.

The substantial advantage of the invention is that, with one supporting element and one or two elastomer elements a stand-alone sealing system is created, whereby the handling of this system is substantially facilitated and the system needs only to be adhered to one component or to one surface to be sealed. The sealing element can have any desired form and can adapt optimally to the contour of the surfaces or parts to be sealed.

If a supporting element is used for attaching an elastomer element, it is then advantageous to provide the supporting element with at least two elastomer elements so that, on the one hand, the sealing of the support element to a base structure is assured, and on the other hand the seal to the part to be sealed is also assured.

In a preferred embodiment of the invention the two elastomer elements are joined to each other. Of course, it is also possible to arrange the elastomer elements in optimum positions on the support element. Preferably, the support element is an injection molded synthetic resin part, but it can also be a sheet metal part or a part formed from a suitable material. The elastomer element is vulcanized onto the support element; this preferred method of fastening also can withstand great stress in the case of an interlocking attachment.

In a preferred embodiment of the invention a sealing element is used in the air intake system of an internal combustion engine, where especially in the case of a switchable intake tube a plurality of moving elements are arranged which require corresponding sealing systems.

These and additional features of preferred embodiments of the invention will be found not only in the claims but also in the description and the drawings, the individual features being applicable individually or jointly in the form of subcombinations in embodiments of the invention and in other fields and may represent advantageous as well as independently patentable embodiments, for which protection is hereby claimed.

BRIEF DESCRIPTION OF THE DRAWINGS

The invention is further explained below with reference to working embodiments.

DETAILED DESCRIPTION OF PREFERRED EMBODIMENTS

Figure 1:
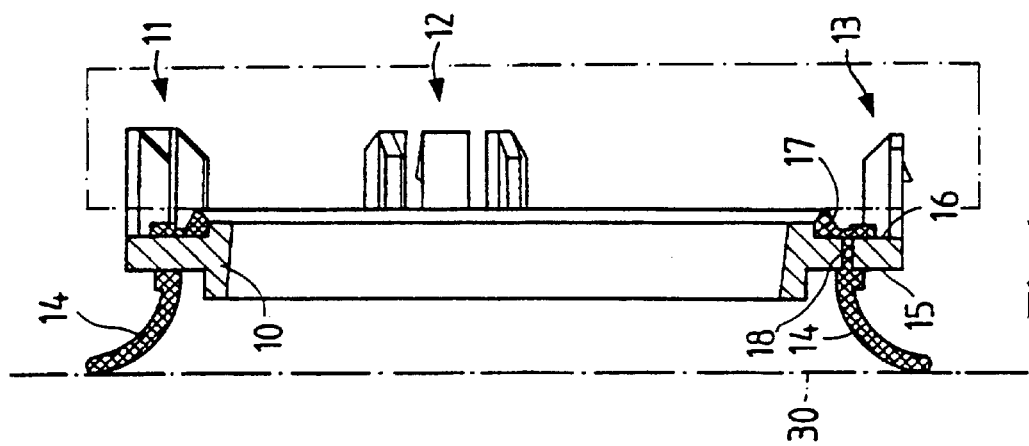
FIG. 1 shows a sealing element in a sectional view.

The sealing element according to FIG. 1 is comprised of a support element 10, which is a substantially open annular body which has catch elements 11, 12 and 13 distributed on the circumference. These catch elements are necessary in order to fasten the support element 10 to a flat structure not shown here. On the left side of the support element 10 a flaring seal serving as an elastomer element 14 is vulcanized or injection molded onto a contact surface 15. On the right side an elastomer element 17 is also vulcanized or injection molded onto a contact surface 16 of the support element 10. The two elastomer parts can be produced separately, and it is also possible, if connecting openings 18 are provided on the support element along the margins of the seal and, when the elastomer element is vulcanized or injection molded, the elastomer is made to flow by appropriately great pressure through the connecting openings and thus to form, in a single step, an elastomer element 14 and 17 extending along both sides.

Figure 2:
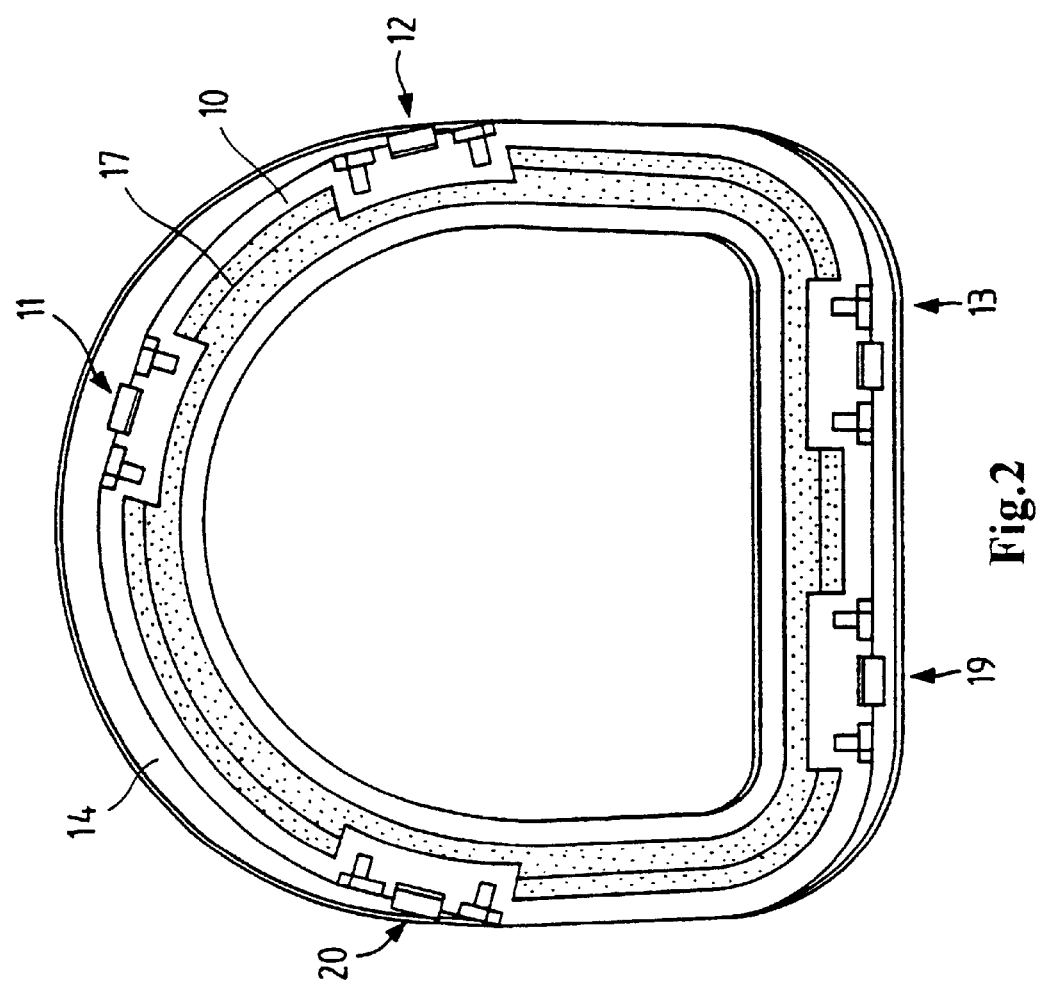
FIG. 2 shows the sealing element depicted in FIG. 1 in a plan view.

FIG. 2 shows in a plan view the support element 10 with the catch elements 11, 12, 13, 19, 20. The elastomer element 17 is visible on the side facing the observer. On the opposite side the elastomer element 14 is visible in the outer area.

Figure 3:
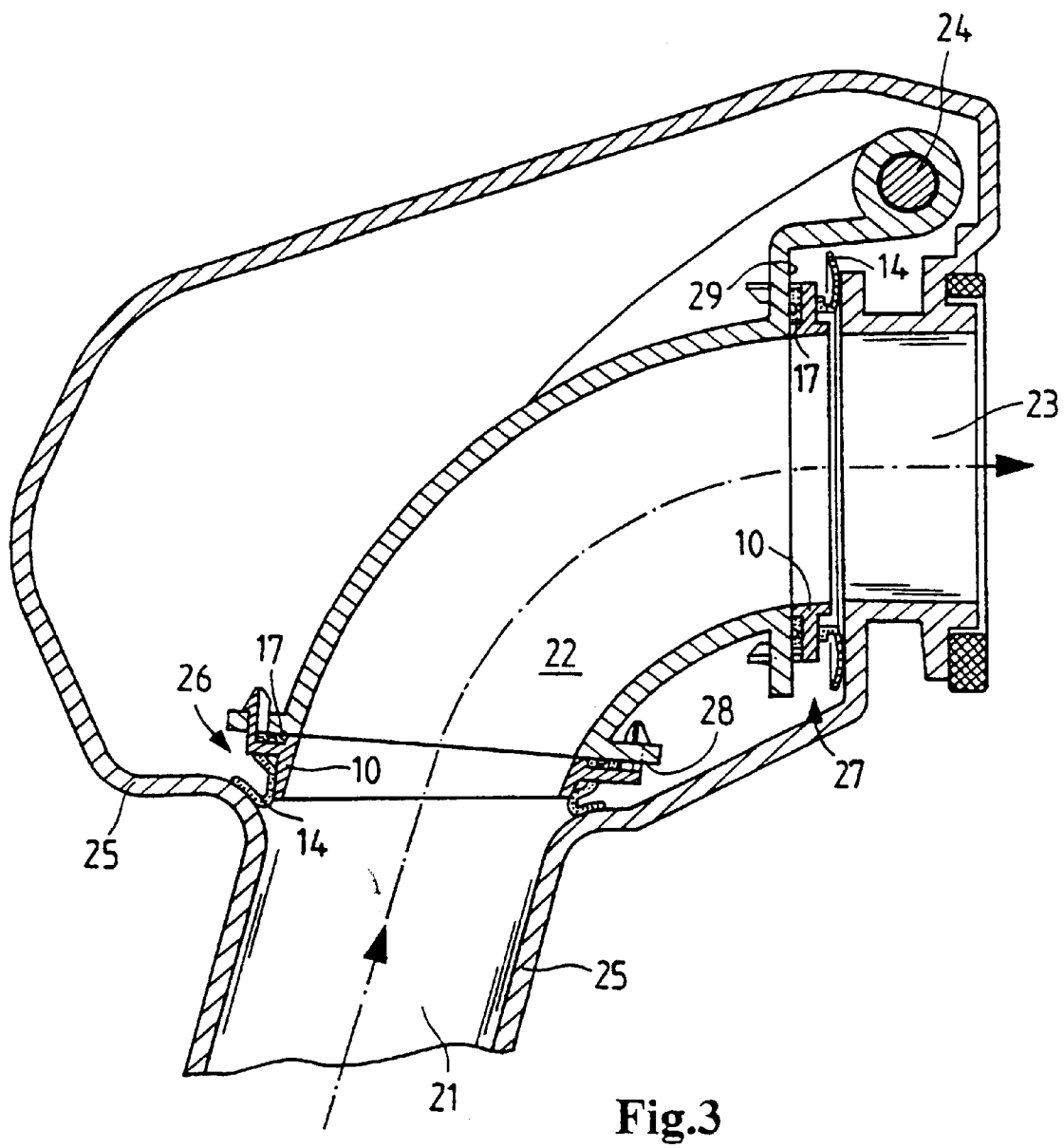
FIG. 3 shows an air intake system with sealing elements in a sectional view.

FIG. 3 shows an air intake system for an internal combustion engine in a schematic sectional view. Intake air passes through the inlet opening 21 into the swiveling channel 22 and from there to the outlet opening 23 which is normally flange-mounted at the air intake of an internal combustion engine. The swiveling channel 22 is mounted for rotation on a shaft 24 and bears a sealing element 26 and 27 at each of its ends facing the base structure 25 of the intake system. As shown in FIG. 1 and FIG. 2. The sealing element is fastened in each case by its catch elements to the flange surfaces 28 and 29 of the swiveling channel 22. The elastomer element 17 thereby serves respectively for sealing between swiveling channel 22 and support element 10, and the elastomer element 14 serves for sealing between the swiveling channel and the base structure 25.

Figure 4:
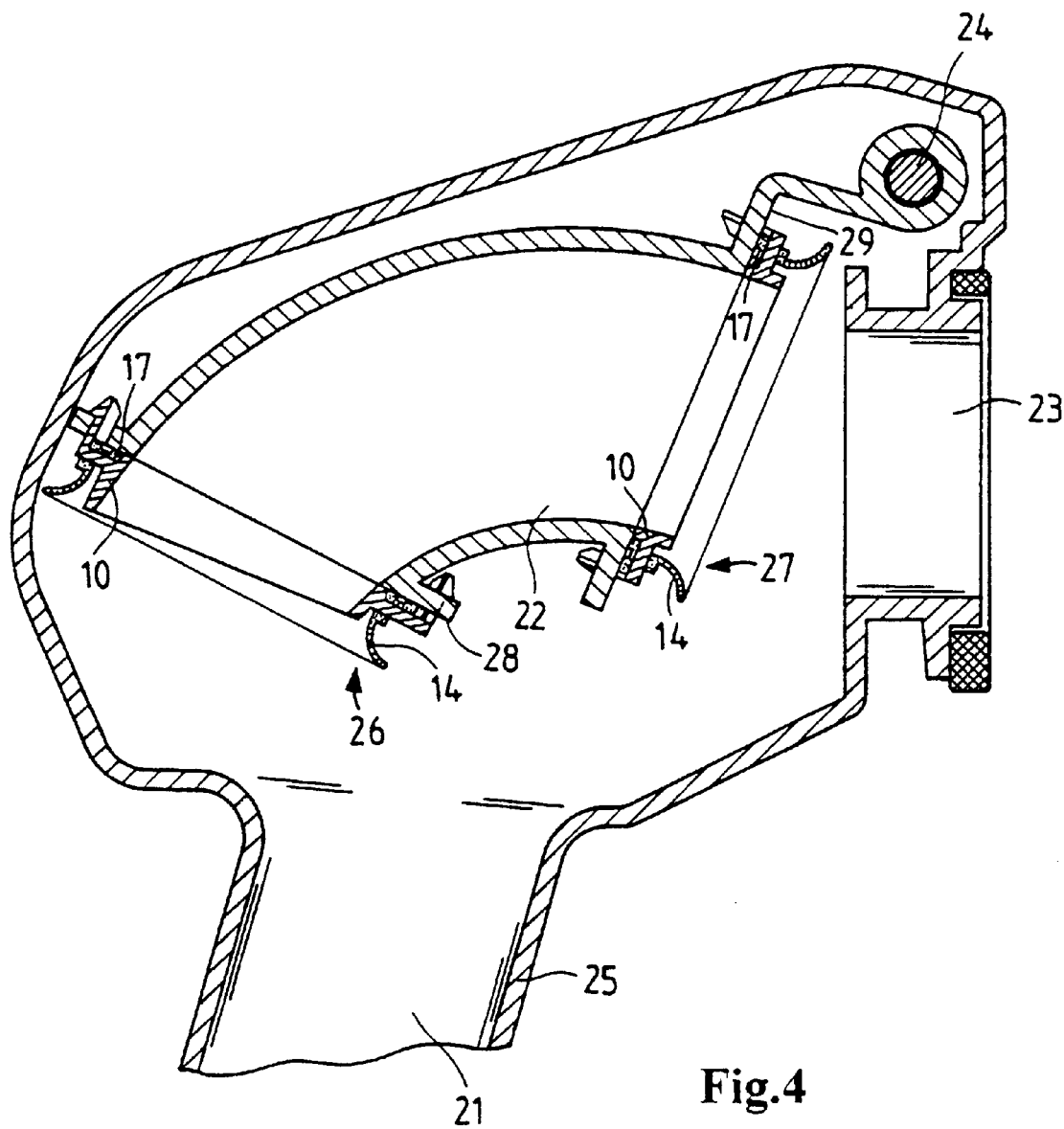
FIG. 4 shows the system illustrated in FIG. 3 with the flap open.

FIG. 4 shows the intake system represented in FIG. 3 with the swiveling channel 22 open. Like parts are identified by the same reference numerals.

A comparison between FIG. 3 and FIG. 4 shows that the sealing elements 26 and 27 are optimally fitted to the base structure 25 when the swiveling channel 22 closes.

What is claimed is:

1. An air intake system for an internal combustion engine comprising:

a base structure comprising a first planar surface; and a swivellably movable, selectively activatable intake tube section comprising a second planar surface, the intake tube section being detachably connected to a sealing element for sealing the second planar surface of said intake tube section to the first planar surface of the base structure of said air intake system when said tube section is in an activated position;

wherein the sealing element comprises an injection molded synthetic resin support element having a plurality of catch or snap-fastening elements, said catch or snap-fastening elements engaging mating receptacles on said intake tube section to attach said support element to said intake tube section, said support element comprising a substantially open annular body carrying two elastomer elements each of which produces a seal between the support element and a respective one of the first and second planar surfaces, said elastomer elements being arranged on opposite sides of said support element from each other and being vulcanized or injection molded onto the support element.

2. An air intake system according to claim 1, wherein said two elastomer elements are connected to each other and form a unitary article.

* * * * *